United States Patent [19]

Chargin, Jr. et al.

[11] Patent Number: 5,497,244

[45] Date of Patent: Mar. 5, 1996

[54] METHOD FOR STORAGE AND RETRIEVAL OF VIDEO FROM DISKS

[75] Inventors: James E. Chargin, Jr., Auburn; Charles Q. Hoard; Dallas B. Wivholm, both of Grass Valley; Keith A. Merson, Auburn; Shawn V. A. Carnahan, Nevada City, all of Calif.

[73] Assignee: Scitex Digital Video, Inc., Grass Valley, Calif.

[21] Appl. No.: 247,500

[22] Filed: May 23, 1994

Related U.S. Application Data

[63] Continuation of Ser. No. 11,274, Jan. 29, 1993, abandoned.

[51] Int. Cl.$^6$ .................................................. H04N 5/76
[52] U.S. Cl. .............................. 358/335; 360/22; 360/23; 360/33.1
[58] Field of Search ..................................... 358/335, 342, 358/310, 311; 348/384, 387, 390; 360/22, 23, 32, 33.1, 35.1; H04N 5/76

[56] References Cited

U.S. PATENT DOCUMENTS

| 4,163,249 | 7/1979 | Michael et al. | 348/580 |
| 5,132,807 | 7/1992 | Takimoto et al. | 358/335 |
| 5,159,460 | 10/1992 | Senso | 358/310 |
| 5,179,453 | 1/1993 | Tozaki | 358/342 |
| 5,237,424 | 8/1993 | Nishino et al. | 358/310 |

Primary Examiner—Tommy P. Chin
Assistant Examiner—Khoi Truong
Attorney, Agent, or Firm—Limbach & Limbach

[57] ABSTRACT

A television storage system for editing and special effects equipment in which live video input material is recorded and converted into two parallel streams of real time live video with the input video recorded as compressed segments independently accessible on multiple synchronous disk drives.

9 Claims, 3 Drawing Sheets

METHOD FOR STORAGE AND RETRIEVAL OF VIDEO FROM DISKS

This is a continuation of application Ser. No. 08/011,274 filed on Jan. 29, 1993 now abandoned.

BACKGROUND OF INVENTION

Using videotape as a storage medium when editing a video program has two distinct disadvantages. First, it is a linear storage medium, which means that to get from one recorded piece of video to another, the video tape machine has to physically spool through all of the intervening material. This takes time, which can significantly add up in a typical editing session (it also results in mechanical wear and tear on the storage medium). Secondly, a video tape machine can only play back one video stream at a time. This means that if multiple videos are needed at a given time (for example, during a transition or as part of a "split screen" effect) multiple videotape machines must be used. If the two selections were recorded on the same videotape, a copy of that tape must be made and played on the second videotape machine to allow both selections to be played simultaneously. The process of copying a tape (or selections therefrom) takes time and can cause signal degradation.

The first problem outlined above can be fixed by recording the video material on a random-access storage medium, such as a computer disk system. Such systems are currently available, but still have the disadvantage that they can play back one selection at a time. Again, if multiple video streams are needed at once, multiple disks are required. If the two desired selections are recorded on the same disk, a copy must be made to allow simultaneous playback. This copying takes time and can again cause signal degradation. Also, the need to make copies limits the editor's creativity, since changes to the program may require making more (or different) copies—again involving time and possible degradation. Also, it is common to keep an "edit decision list" (or EDL) which describes the sequence of video selections made in a program. Having to make (and use) copies adds a layer of complication to the EDL, since it is not often clear where the original material came from.

SUMMARY OF INVENTION

The ImMIX "VideoCube" system is an integrated multi-stream digital video post production system, which uses computer disks to record and playback video and audio. Use of such disks allows random access to the recorded material, significantly improving the editing time. In addition, the disk system is arranged such that two simultaneous video playback streams are produced at all times, allowing real-time transitions between two moving sources, infinite duration "split-screen" effects, etc.

The basic video storage portion of the system uses two standard computer disk drives (the audio storage is kept on a separate disk drive, and is not part of this disclosure). However, instead of using two independent drives, each with one video output stream (and all of the disadvantages outlined above), the two drives are treated as one larger drive which can produce two simultaneous video streams. Thus, the user sees a large "pool" of recorded video, from which s/he may select any two pieces to be played back simultaneously. There are no restrictions (to the user) as to which two s/he may use at a time, and there is no copying of material (either inter- or intra-disk) to make it possible.

One traditional way to (appear to) do two things at once is to use faster devices and time-multiplex them so that they are used to do a little of Process A, followed by a little of Process B, then a little more A, more B, etc.

Unfortunately, this technique does not work for common disk drives and video, since the bandwidth of video is much higher (even when compressed), and two streams of good quality video cannot be supported by today's off-the-shelf disk drives. (A single disk can—just barely—handle one real-time, good quality video stream). Half of the material could be placed on each disk, but this would result in all of the "copying" problems outlined above.

Instead, the VideoCube system "splits" the video so that each drive has exactly half of all of the recorded video. This way, playing back one video stream means each drive is working "half as hard", since it is only responsible for reproducing half of the recorded material. The above time-multiplexing can then be used to produce two streams, since each drive is effectively working on two half-streams. Since each drive has its half of all of the recorded material, the two streams look as though they are coming from a common "pool" of recorded material.

Of course, splitting a video stream into "halves" means more than just putting one second on the first drive, the next second on the second, etc. Because the video editing process must be able to select material on video frame boundaries (a frame is one complete scan of a picture: in North America approximately 1/30 of a second), the splitting must be done as half of each video frame.

DETAILED DESCRIPTION

Figure 1:
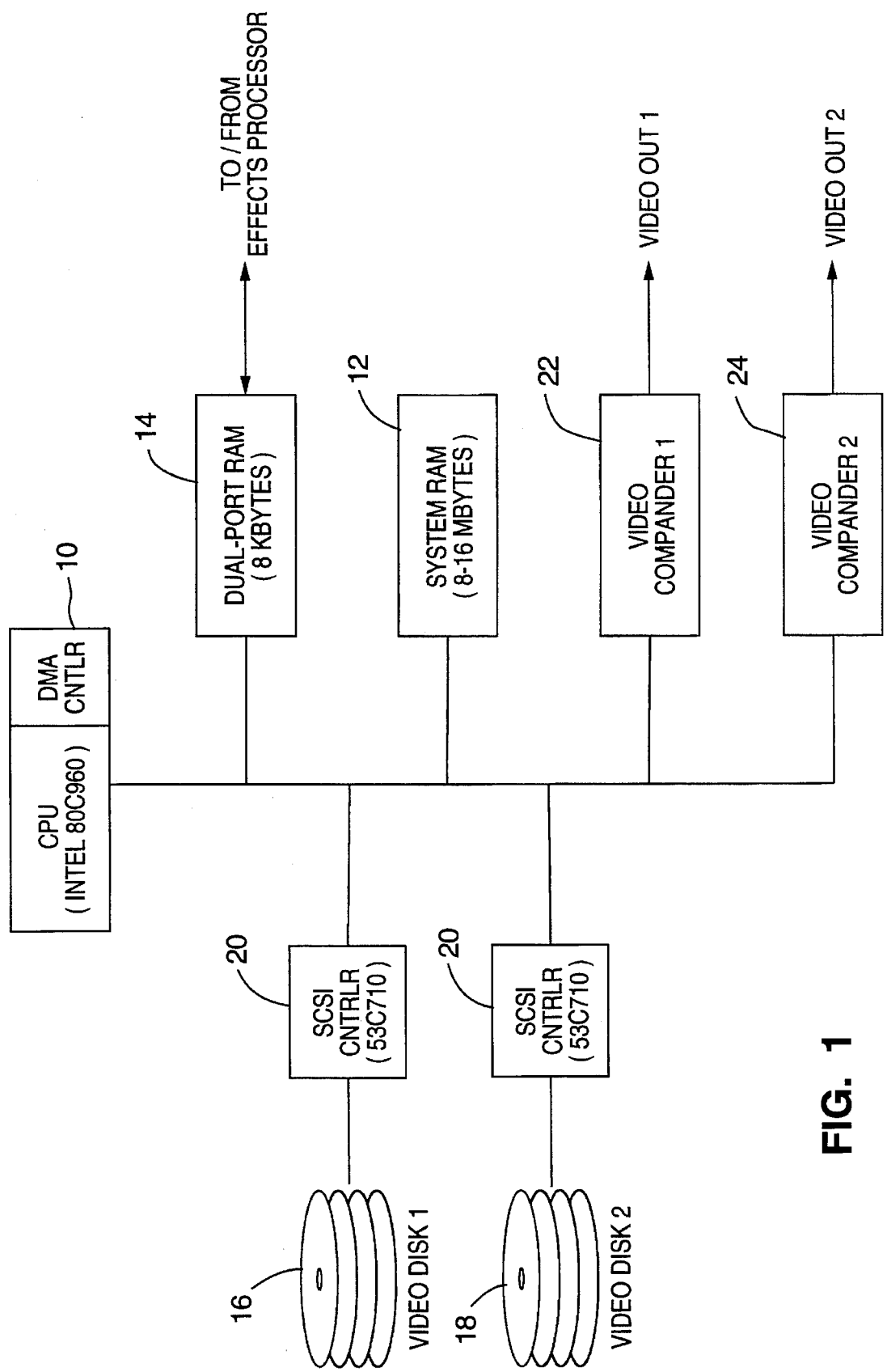
FIG. 1 is a block diagram of the "preferred embodiment", used in the VideoCube product.

In the VideoCube system, video to be recorded is input in one of two analog formats (NTSC composite or Y/C), digitized and decoded into component YUV format. The video stream is then compressed in real-time by an adaptive, intra-field, lossy compression technique (which technique is not germane in this discussion, but the size of the output of the compression does vary with changing input material). Each incoming video field (½ of an interlaced video frame) is independently compressed. The output of the compression is placed in a RAM buffer.

At the end of each video frame, a microprocessor looks at the combined size of the two compressed video fields that comprise the frame. The total is divided by two, and the first half (called "recorded field 1") is recorded on disk drive A, while simultaneously the second half (called "recorded field 2") is recorded onto disk drive B. Note that the recorded "fields" are usually close to, but not necessarily the same as, the video fields 1 and 2 that produced them. Since variable length compression is employed, the recorded field 1 may contain some material from video field 2 or vice versa. (Other "splitting" techniques could also be used. For example, recording bits 0–3 for the entire frame on one drive, and bits 4–7 on the other. This splitting takes longer to do in software, however.)

The two halves are recorded in the same physical locations (track and sector) on both drives. While this is not strictly necessary for the sake of bandwidth, it does considerably simplify the file directories, since only a single directory is needed for the two drives. The directory consists of a track/sector pointer for each video frame recorded on disk, so it can be quite large, and a savings of ½ is appreciable. This directory sharing has some side effects. For example, a bad sector which exists on one drive must be mapped out of the other drive so it cannot be used by either.

The video frames are recorded in contiguous tracks and sectors on the disk, which again cuts down on the number of seek operations required on the disks. Also, the drives are kept "locked" by a hardware synchronization cable between the two drives. This keeps the drives rotating at the same rate, which makes it more likely that the two "fields" of data will be recorded at approximately the same time. A RAM buffer is used as a FIFO (First In-First Out) queue to store the compressed video data (which comes out of the video compression circuits at a relatively constant rate) and the disk drives (which record data at a relatively indeterminate rate, depending on when track seeks or internal disk head calibrations are required).

On playback, a selected piece of video is found by looking up the location (drive/track/sector) of the desired frame(s) in the directory (normally kept in RAM storage to speed up accesses), then issuing commands to the drives via their controlling SCSI Controller hardware. Once the seek to the physical location is accomplished, the data from each drive is loaded into RAM buffers which again act as FIFO queues to smooth out the uneven data flow from the disk drives. The queue is also where the two halves of the frame (one field each from the two drives) is reassembled. The output is then fed to the video decompressor, which produces the full-rate video output signal. In the VideoCube product, this signal passes through some output video processing and special effects hardware (not part of this disclosure) before being re-encoded to composite NTSC and Y/C forms, then converted back to analog video and output.

Since the purpose of this process is to make two simultaneous video streams, there are two video FIFOs which are alternately filled by the disks. The FIFOs feed separate video decompression circuits, which then output the two full-rate video streams to the processing and effects circuits. One way to alternate the disk activity between the two streams would be to read one frame (one field each from both drives) for the first stream, then read a frame from the second stream, then back to the first stream, and so forth. If it took no time to switch the drives between streams this plan would work fine, since each drive only has to read a half frame (in a video frame's time) for each stream. However, disk seek operation can take tens of milliseconds, depending on the distance the heads have to physically move, which represents time that no data is being moved (to put things in perspective: a video frame is approximately 33 msec.). Thus we want to minimize the number of times the disks are engaged in this relatively "expensive" seek activity.

Again, the system takes advantage of the recording technique of putting adjacent video frames on adjacent sectors. This means that to move from one frame to the next (within a given video selection) has no time penalty, since the head is located at the right place already. This suggests that we are better off reading multiple frames in a row from the same selection, then seeking to the second video stream to read multiple frames there. The tradeoff is in the RAM FIFO size: the longer the drive stays on each stream, the longer the FIFOs have to be to avoid emptying the other. The economics of this tradeoff vary with specific disk drives, the amount of video compression employed (the average and peak number of bytes per video frame), and the current cost of RAM memory. The FIFOs also are used to smooth over disk "features" such as thermal recalibration.

The subject of "peak" data rates is worth additional discussion, since a real-time system such as this has to work all of the time, not just "on average". Most variable length compression schemes can result in a wide range of output (compressed) frame lengths, depending on the complexity (compressibility) of a scene. Two techniques are possible: design the system to handle the absolute worst-case (i.e. largest frame size) that the compression system could produce, or limit the compression to produce, guaranteed, no larger than a predetermined number of bytes per frame, and design to that "worst-case".

The VideoCube uses the latter system, since the predicted worst-case without limits can be considerable. Instead, a number of bytes is chosen when represents: a) a convenient (i.e. binary multiple) number to work with in software; and b) a size that will encompass all but the most extreme compression cases. That number (at present 64K, or 65,536 bytes) is assumed to be the absolute worst case for software buffer sizing and bandwith considerations. After a given frame has been compressed, its size is compared against the maximum. If the size is greater then the maximum, the second field's data is thrown away, and a flag is set to indicate that the first field is to be sent to the decompressors twice upon playback, once for each field. Since a video field is all of the odd or all of the even lines of a video frame, this loss means that every other line in the frame is replaced by a duplicate of the one above it, or a loss of ½ the vertical resolution. This is generally deemed to be a better "fallback" than having to throw away some of the compressed data (which would result in a loss of portions of the picture), or having to design for yet higher bandwidths to handle the exceptional frames.

Referring now in detail to FIG. 1, the video storage subsystem consists of a microprocessor 10 (in this case, an Intel 80C960CA with integral DMA Controller), 8 Megabytes of random-access memory (RAM) 12, 8 KBytes of Dual-port RAM (14), and two 1.6 Gigabyte disk drives 16 and 18 (Seagate ST41600ND), connected through independent SCSI (Small Computer Systems Interface) Controllers 20. Additional disk storage may be added by placing more disk drives (in pairs) on the SCSI busses, up to the limit of the bus (6 additional pairs of drives). Also available to the microprocessor are the I/Os of two video compander circuits 22 and 24.

The Storage Subsystem is a part of a large product, consisting of audio recording/playback, audio/video special effects, and a user-interface system. These additional parts of the overall system are not part of this patent application, and are not described here, other than to point out that communications with the Storage Subsystem is by way of the dual-port RAM. This allows an external microprocessor to write and read "messages" to and from the Storage Subsystem in shared areas of memory.

The choice of specific parts and amounts of RAM and disk storage are determined by: a) the amount of video storage desired; b) the amount of video compression employed; c) the quality of the resultant video; (a) the type and speed of the disk drives; and e) the projected cost of the product. The design targets for the VideoCube were: a) 1 hour of video storage (per pair of 1.6 GByte drives); b) a nominal 25:1 compression ratio; c) "professional" video quality; d) standard (albeit large) computer disk drives (i.e. not customized for speed/performance considerations); and e) as low cost as possible, subject to (a), (b), (c) and (d).

For a "basic" VideoCube product (1 hour of video storage) the Storage Subsystem RAM 12 is allocated as follows:

2 MBytes microprocessor program/data storage, 1.25 MBytes disk directory space, 0.75 MBytes audio record/playback queues, 4 MBytes video FIFO queue space, suballocated as follows:

64 buffers of 64 KBytes each for one record

FIFO queue, or

1 MBytes each for four playback FIFO queues

Note: these numbers include allocations for audio recording/playback, which is not part of this invention.

The video queue memory is "shared" between record and playback: when in record mode, the queue space is allocated for a single record queue; when in playback, the memory is allocated for four shorter playback queues.

When multiple disk drive pairs are used for increased storage, the amount of RAM needed for disk directory space increases by 1.25 MBytes per disk pair. The other allocations do not change.

Figure 2:
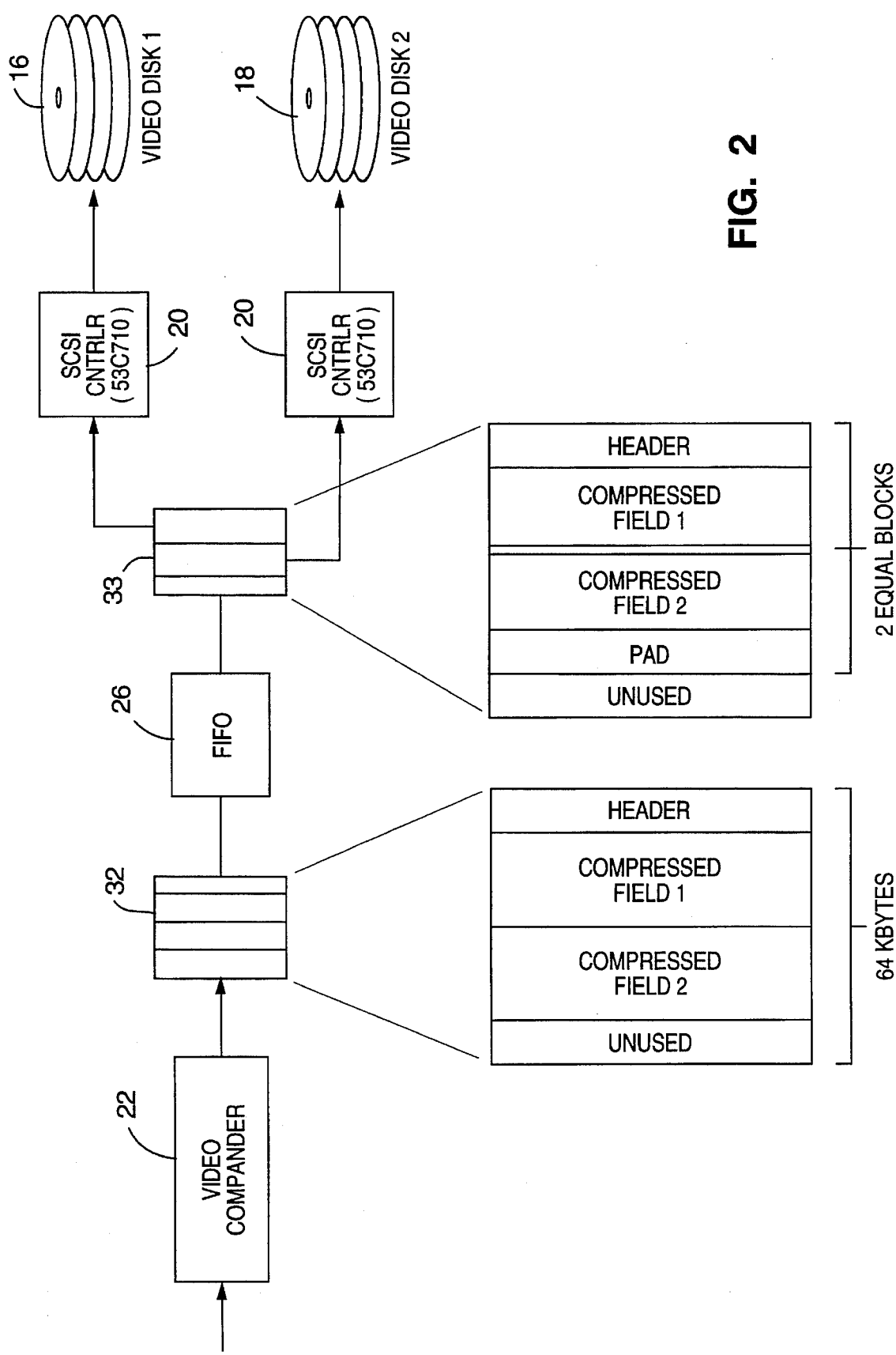
FIG. 2 is a block diagram of the conceptual signal flow for a single stream of recorded video.

Referring to FIG. 2, video enters one of the video companders at full video pixel rate (the VideoCube digitizes the video at a 12.27 Megapixel/second rate, 8-bit 4:2:2 YUV data format) and is compressed (the actual compression technique employed is not important to this process). Since each video frame consists of two interlaced fields transmitted consecutively in time, the output of the compander is also two consecutive compressed fields, which are typically close in size but not necessarily equal. The two compressed fields, along with a header block describing the length and location of the two fields of data (32), are written into the next available cell of a First-In, First-Out (FIFO) queue (FIFO 26), which is used to smooth out the difference in data rates between the output of the compander and the disk drives.

When it is time to record a frame of compressed video to the disk drives (16 and 18), the microprocessor looks at the combined length of the header and both compressed fields and pads it out to an even (i.e., divisible by two) number of 1 KByte (1024 byte) sectors. It then programs the two SCSI Controllers (20) for the two drives with a pointer and a length. The first controller/drive gets a pointer to the beginning of the cell, with a length of half of the total (including pad) data size for the frame (33). The second controller/drive gets a pointer to the half-way point of the frame (33) of data, with the same length. The two controllers then record the data on their respective drives, starting at the pointer address and continuing for the "half" number of bytes.

Figure 3:
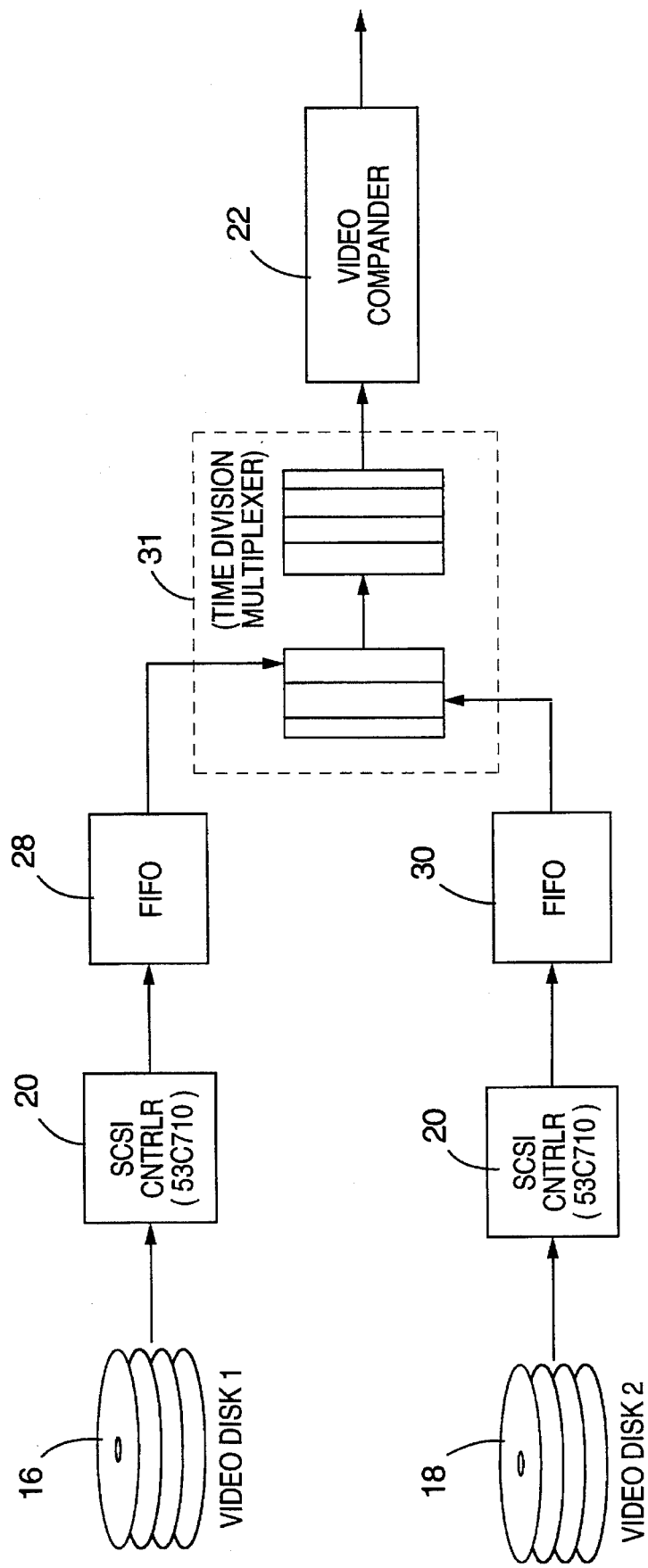
FIG. 3 is a similar diagram for the playback data flow.

Referring to FIG. 3, the playback process is similar (in reverse), except that the two half frames played back from each drive are kept in separate queues 28 and 30 and combined (time division multiplexed) in time division multiplexer 31 prior to being sent to the compander 22. (There is no specific reason why the record flow could not look like the playback—or vice versa). In addition, unlike the record queue, the playback queues do not have pre-allocated buffers: the compressed halves of the frame playing back from the disks are placed contiguously in each queue.

The implementation of two streams is similar, except that two sets of FIFOs and video companders are used. The FIFOs for each stream are used to buffer the data so that the drives can time-multiplex accesses between the two streams. We have found that the drives preferably read a minimum of six frames of data for one stream before switching over to the other to optimize drive bandwidth; reading fewer frames results in too much time spent in disk seeks. Reading more frames requires longer FIFO queues so that the stream not being read can sustain itself.

It can be seen that the main reason for using two drives is to double the available bandwidth from the storage media—allowing more streams of data for the same compression, or allowing less compression (better quality) for the same bandwidth. This technique could also be extended to more than two streams with more than two drives.

What is claimed:

1. A method of producing a plurality of real time video output signals from input video materials which contain frames of video data at a frame rate, said method comprising:

(a) compressing frames of an input video signal having the frame rate to generate a compressed input video signal, where the compressed input video signal comprises fewer bytes than the input video signal and has said frame rate, (b) dividing the compressed input video signal into a plurality of independent segments by dividing each frame of said compressed input video signal into a predetermined number of segments, (c) forming a plurality of series of frame segments with each series in said plurality including like segments of different frames, (d) storing the separate series of segments as separately accessible records, (e) retrieving a first group of the records, (f) recombining the retrieved segments of the first group of the records to produce a first output signal containing a first segment of each of the frames of said compressed input video signal and having said frame rate, (g) retrieving a second group of the records concurrently with retrieval of the first group, (h) recombining the retrieved segments of the second group of the records to produce a second output signal concurrent with the first output signal, containing a second segment of each of the frames of said compressed input video signal, and having said frame rate, and (i) time division multiplexing the first output signal with the second output signal to generate a final output video signal capable of being displayed on a single display screen.

2. The method of claim 1, also including the step of:

decompressing the retrieved segments of the first group and the second group.

3. The method of claim 1 in which step (d) is performed by providing a plurality of disc drives, one for each of the different segments of a frame with each of the drives having a plurality of recording tracks with track addresses, operating the disc drives in synchronization with each other, and simultaneously recording all of the segments of the frame on different ones of the disc drives at a single common track address.

4. The method of claim 1 also including the step of:

limiting the peak content of data recorded for an individual frame of the input video signal, where said input video signal has two interlaced fields per frame and the individual frame consists of a first field and a second field, by measuring the size of the segments of the compressed input video signal, when the segments of the compressed input video signal corresponding to the individual frame have size exceeding a predetermined size, dropping from the segments recorded a set of the segments containing the second field of the individual frame, and when retrieving stored segments for the individual frame, performing the step of twice decompressing the retrieved segments containing the first field of said individual frame.

5. The method of claim 1, wherein step (c) is performed by adding corresponding segments of different frames to a first set of buffer memories, with a different buffer memory receiving each segment of a frame, step (d) is performed by recording the segments from the first set of buffer memories on synchronized disc memories, step (f) is performed by adding corresponding segments of different frames to a first buffer in a second set of buffer memories, and step (h) is performed by adding corresponding segments of different frames to a second buffer in the second set of buffer memories.

6. Apparatus for producing a plurality of real time video output signals from input video materials which contain frames of video data at a frame rate, said apparatus comprising:

means for compressing frames of an input video signal having the frame rate to generate a compressed input video signal, where the compressed input video signal comprises fewer bytes than the input video signal and has said frame rate, means for dividing the compressed input video signal into a plurality of independent segments by dividing each frame of the compressed input video signal into a predetermined number of segments, means for forming a plurality of series of frame segments with each series in said plurality including like segments of different frames, means for simultaneously storing the separate series of segments as separately accessible synchronous records, means for simultaneously retrieving a first group of the synchronous records, means for recombining the retrieved first group of the synchronous records to produce a first output signal containing a first segment of each of the frames of said compressed input video signal and having said frame rate, means for simultaneously retrieving a second group of the synchronous records concurrently with retrieval of the first group, and means for recombining the retrieved second group of the synchronous records to produce a second output signal concurrent with the first output signal, containing a second segment of each of the frames of said compressed input video signal, and having said frame rate, and means for time division multiplexing the first output signal with the second output signal to generate a final output video signal capable of being displayed on a single display screen.

7. The apparatus of claim 6 characterized further by:

means for decompressing the final output video signal.

8. The apparatus of claim 6 in which the means for simultaneously storing the separate series of segments as synchronous records comprises:

a plurality of disc drives one for each of the different segments of a frame with each drive having a plurality of recording tracks with track addresses, means for operating the disc drives in synchronization with each other, and means for recording the segments of a frame on different ones of the disc drives at a single common track address.

9. The apparatus of claim 6 in which the means for forming a plurality of series of frame segments comprises a plurality of buffer memories one for each segment of a frame, the means for storing the separate series of segments comprises a disc drive for recording the segments from each of the buffer memories with the disc drives synchronized to each other, and the means for recombining retrieved synchronous records comprises twice as many buffer memories as the memories in the means for forming with a different buffer memory for each segment of a frame in the first group and each segment of a frame in the second group.

* * * * *